United States Patent [19]

Tinker

[11] Patent Number: 5,506,067
[45] Date of Patent: Apr. 9, 1996

[54] RECHARGEABLE ELECTROCHEMICAL CELL AND CELL CASE THEREFOR WITH VENT FOR USE IN INTERNAL RECOMBINATION OF HYDROGEN AND OXYGEN

[75] Inventor: Lawrence A. Tinker, Woodstock, Ga.

[73] Assignee: AER Energy Resources, Inc., Atlanta, Ga.

[21] Appl. No.: 416,043

[22] Filed: Apr. 4, 1995

[51] Int. Cl.$^6$ .................................................. H01M 2/12
[52] U.S. Cl. ............................ 429/27; 429/86; 429/53
[58] Field of Search ............................ 429/27, 72, 82, 429/86, 89, 53, 57, 176

[56] References Cited

U.S. PATENT DOCUMENTS

| | | | |
|---|---|---|---|
| 2,452,066 | 10/1948 | Murphy | 136/179 |
| 2,687,448 | 8/1954 | Gulick et al. | 136/179 |
| 2,704,781 | 3/1955 | Mautner et al. | 136/170 |
| 3,507,708 | 4/1970 | Vignaud | 136/177 |
| 3,522,099 | 7/1970 | Schulte et al. | 136/86 |
| 3,600,228 | 8/1971 | Conti | 136/86 |
| 3,832,238 | 8/1974 | Takao Marui et al. | 136/179 |
| 3,904,441 | 9/1975 | Badger | 136/177 |
| 3,909,302 | 9/1975 | Mermelstein | 136/177 |
| 4,002,496 | 1/1977 | Nitta et al. | 429/53 |
| 4,098,964 | 7/1978 | Reber | 429/86 |
| 4,147,841 | 4/1979 | Shroff | 429/86 |
| 4,885,218 | 12/1989 | Andou et al. | 429/53 |
| 4,925,744 | 5/1990 | Niksa et al. | 429/27 |
| 4,925,746 | 5/1990 | Pavlov et al. | 429/57 |
| 4,925,747 | 5/1990 | Kordesch et al. | 429/59 |
| 5,156,925 | 10/1992 | Lapp | 429/19 |
| 5,187,746 | 2/1993 | Narisawa | 381/68.7 |
| 5,362,577 | 11/1994 | Pedicini | 429/27 |

FOREIGN PATENT DOCUMENTS

| | | |
|---|---|---|
| 0391443A3 | 10/1990 | European Pat. Off. . |
| 1459135 | 12/1976 | United Kingdom . |
| 2021306 | 11/1979 | United Kingdom . |

*Primary Examiner*—Anthony Skapars
*Attorney, Agent, or Firm*—Jones & Askew

[57] ABSTRACT

A case for a rechargeable electrochemical cell comprises a vent disposed in the case interior, the vent including an oxygen/hydrogen recombination catalyst for catalyzing the recombination of the hydrogen produced by the cell during the recharge mode with oxygen in the case interior to form water in the case interior. The vent comprises a vent support extending inwardly from the cell case shell, a gas permeable, electrolyte impermeable vent cover membrane adjacent the interior surface of the vent support, and a foraminous catalyst support disposed in the case adjacent the interior surface of the vent cover membrane so that the vent cover membrane is sandwiched between the catalyst support and the vent support. Oxygen from the ambient air permeates the vent cover membrane and recombines with the hydrogen in the cell case interior. A rechargeable electrochemical cell comprising the cell case is encompassed and the cell is desirably a metal-air cell.

58 Claims, 3 Drawing Sheets

RECHARGEABLE ELECTROCHEMICAL CELL AND CELL CASE THEREFOR WITH VENT FOR USE IN INTERNAL RECOMBINATION OF HYDROGEN AND OXYGEN

TECHNICAL FIELD

This invention relates to electrochemical cells, and more particularly relates to the recombination of hydrogen and oxygen in rechargeable metal-air electrochemical cells.

BACKGROUND OF THE INVENTION

Electrochemical cells provide electrical power via a chemical reaction. A typical electrochemical cell includes a pair of electrodes called an anode and a cathode separated by an electrolyte composition. The anode, cathode, and electrolyte are contained in a case and when the anode and cathode are electrically connected to a load, a chemical reaction between the anode, cathode, and electrolyte releases electrons and delivers electrical energy to the load.

Metal-air electrochemical cells utilize oxygen from ambient air as a reactant in an electrochemical reaction to provide a relatively lightweight power supply and include an air permeable cathode and a metallic anode separated by an aqueous electrolyte. Metal-air cells have a relatively high energy density because the cathode utilizes oxygen from ambient air as a reactant in the electrochemical reaction rather than a heavier material, such as a metal oxide or another depolarizable metallic composition. For example, during operation of a zinc-air cell, oxygen from the ambient air is converted at the cathode to hydroxide ions, zinc is oxidized at the anode, reacts with hydroxide ions, and water and electrons are released to provide electrical energy.

Cells that are useful for only a single discharge cycle are called primary cells, and cells that are rechargeable and useful for multiple discharge cycles are called secondary cells. An electrically rechargeable metal-air cell is recharged by applying voltage between an anode and the cathode of the cell and reversing the electrochemical reaction. During recharging, the cell discharges oxygen to the atmosphere through the air permeable cathode and the anode is electrolytically reformed by reducing to the base metal the metal oxides formed during discharge.

Hydrogen gas may be produced at the anode as a by-product during recharging of a metal-air cell and other rechargeable electrochemical cells. Hydrogen production normally occurs when the cell is nearly fully recharged and during overcharge of the cell. Hydrogen production increases significantly during overcharging. Typically, vents in the cell case release the hydrogen produced at the anode to the atmosphere. The hydrogen is released to prevent the hydrogen from reacting with other components of the cell and causing cell failure. In addition, it is desirable to prevent buildup of hydrogen in large quantities in the cell.

One drawback to the production of hydrogen and its release from the cell is that water is lost from the cell as a direct result. Water is also lost from a metal-air cell by evaporation through the gas-permeable cathode, but it is estimated that, when the atmosphere surrounding the cell is at about 50% relative humidity, 30–40% of the hydrogen loss from the cell is through electrolytic reaction and production of hydrogen gas. Loss of water through electrolytic reaction can eventually cause a rechargeable metal-air cell to fail due to drying out. This is particularly a problem when metal-air cells are excessively overcharged repeatedly.

Therefore, there is a need for a rechargeable electrochemical cell, and particularly, metal-air cell, in which loss of hydrogen, and thus water, through electrolytic reaction is controlled.

SUMMARY OF THE INVENTION

This invention solves the above-described problems in the art by providing a case for a rechargeable electrochemical cell comprising a vent including an oxygen/hydrogen recombination catalyst for catalyzing the recombination of hydrogen produced by the electrochemical cell during the recharge mode with oxygen in the case to form water in the case. The vent allows oxygen from the ambient air to enter the case and react with the hydrogen in the case. The recombined hydrogen and oxygen form water and replenish to the cell water which would otherwise be lost through electrolytic reaction and production of hydrogen gas during recharge.

More particularly, the case of the present invention is suitable for a rechargeable electrochemical cell which has two modes of operation, a discharge mode in which electricity is produced and a recharge mode in which electrical energy is stored and hydrogen gas may be produced. The case comprises a shell defining a case interior and a vent disposed in the case interior. The shell has a vent opening for receiving gas into the case or releasing gas from the case. The vent comprises a gas permeable/electrolyte impermeable vent cover membrane, a foraminous catalyst support, and an oxygen/hydrogen recombination catalyst. The vent cover membrane has an interior surface facing the case interior and is disposed in the case about the vent opening so as to prevent flow of electrolyte through the vent opening. The catalyst support is disposed in the case adjacent the interior surface of the vent cover membrane and faces the case interior. The recombination catalyst is supported on the catalyst support and catalyzes the recombination of the hydrogen produced by the cell during the recharge mode with oxygen in the case interior to form water in the case interior.

More particularly, the vent further comprises a vent support extending inwardly from the shell about the vent opening. The vent support has an interior surface facing the case interior and an opening for receiving gas into the case or releasing gas from the case through the vent opening in the shell. The vent cover membrane extends over the interior surface of the vent support, covers the vent support opening, and is sandwiched between the catalyst support and the vent support.

Desirably, the vent support defines a chamber within the shell of the case for receiving or discharging air through the vent opening. According to a desired embodiment, the vent support is dome-shaped and has a plurality of openings. More particularly, the vent support has a round base with a recessed portion encircling the base adjacent the shell and the catalyst support comprises a ring and a foraminous screen encompassed by the ring. The screen fits over the vent support and the vent cover membrane, and the ring is received within the recessed portion of the base to clamp the catalyst support to the vent support and sandwich the vent cover membrane between the catalyst support and vent support.

The present invention also encompasses a rechargeable electrochemical cell comprising the above-described case and a cathode, an anode, and a liquid electrolyte all disposed in the case. Desirably, the electrochemical cell is a rechargeable metal-air cell.

Accordingly, an object of the present invention is to provide an improved rechargeable electrochemical cell.

Another object of the present invention is to provide an improved rechargeable metal-air cell.

Another object of the present invention is to provide a rechargeable metal-air cell with enhanced control over hydrogen gas production and water loss.

Still another object of the present invention is to provide a rechargeable metal-air cell that can withstand substantial overcharge during recharge without significant water loss from the cell.

Other objects, features, and advantages of the present invention will become apparent from the following detailed description, drawings, and claims.

DETAILED DESCRIPTION OF DRAWINGS

As summarized above, the present invention encompasses a rechargeable metal-air electrochemical cell comprising a cell case including a vent that catalyzes the recombination of hydrogen and oxygen in the interior of the cell case. A detailed description of an embodiment of the present invention is disclosed in detail below. Although the embodiment shown below is a metal-air electrochemical cell, the present invention is also adaptable to other types of electrochemical cells.

Figure 1:
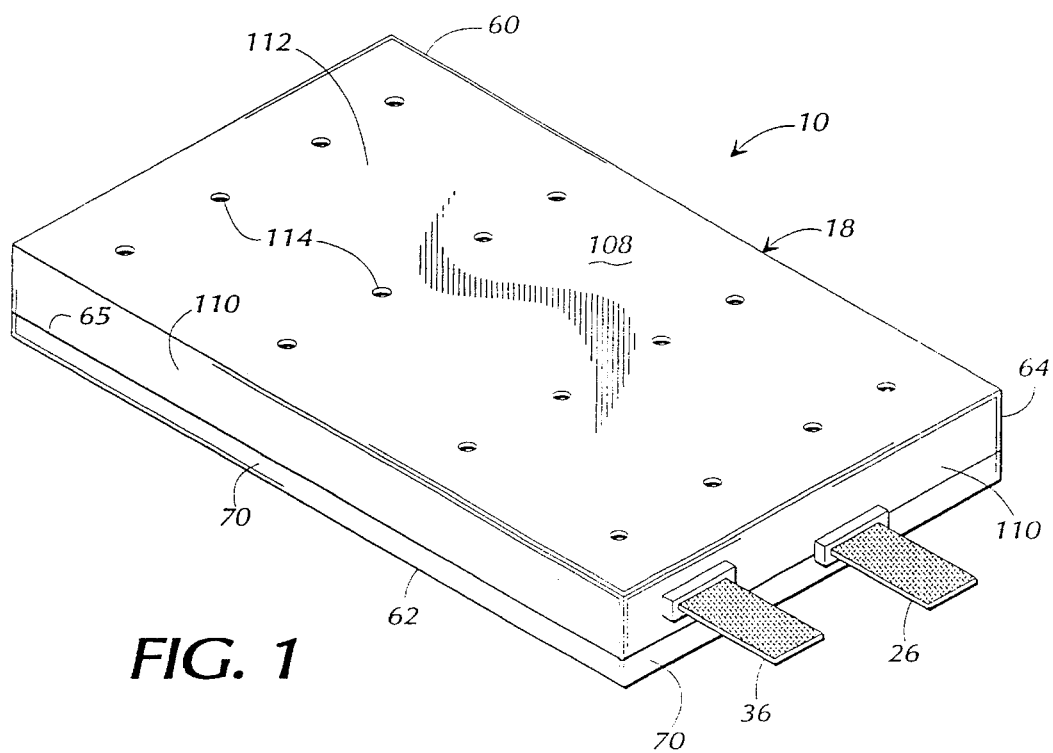
FIG. 1 is perspective view of a rechargeable metal-air electrochemical cell made according to an embodiment of the present invention. The cathode side of the case shell is illustrated in this figure.
Figure 2:
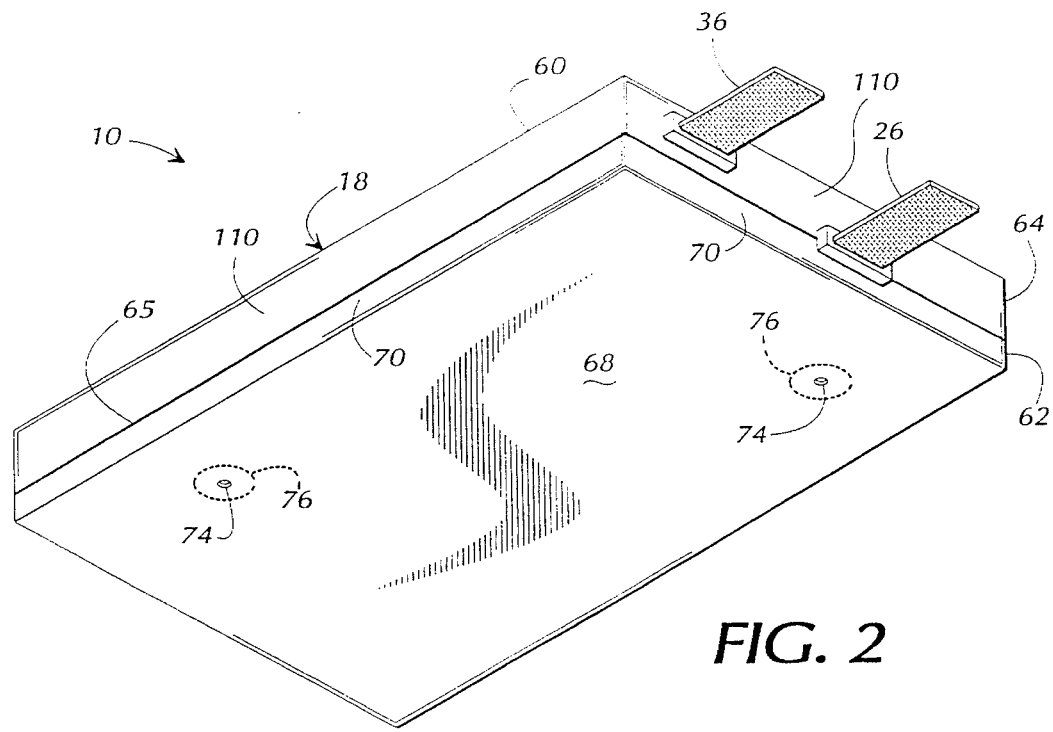
FIG. 2 is a perspective view of the cell shown in FIG. 1 illustrating the anode side of the case shell.
Figure 3:
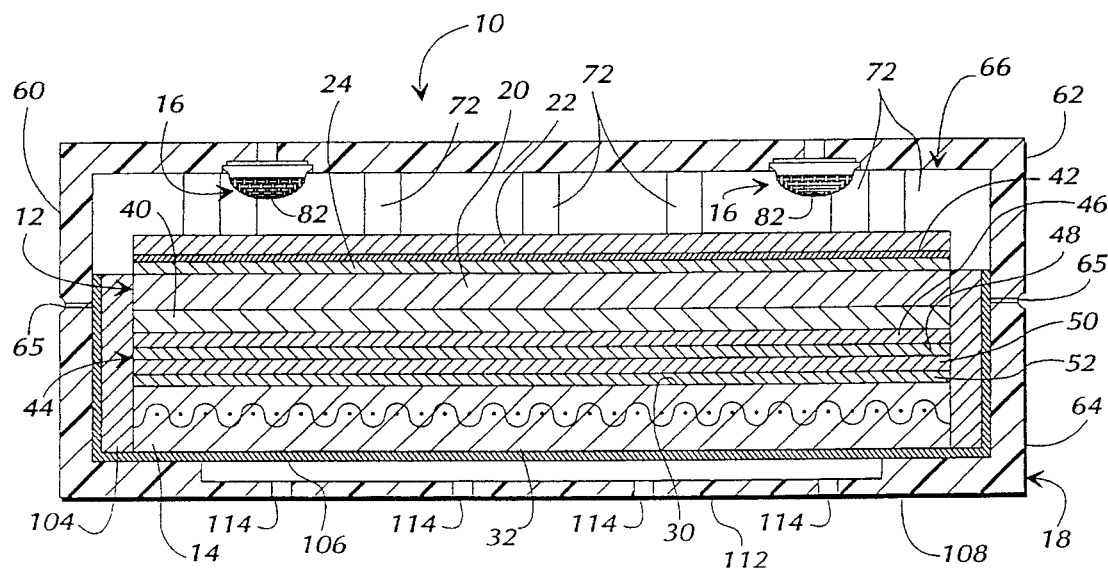
FIG. 3 is a partial, cross-sectional, elevation view of the metal-air cell shown in FIG. 1.

A metal-air cell 10 is shown in FIGS. 1–3 and generally comprises an anode 12, an air cathode 14, vents 16 for use in hydrogen-oxygen recombination, and an electrolyte disposed in a cell case 18. In FIGS. 1 and 2, the cell 10 is oriented so that the cathode 14 is above the anode. In FIG. 3, the cell is inverted so that the anode 12 is above the cathode 14. During normal operation, the cell is desirably oriented so that the anode 12 is above the cathode.

The anode 12 can be any anode suitable for use in a metal-air electrochemical cell, but is shown in FIG. 3 as comprising an anodic layer 20, a rigid support 22, and a current collector layer 24 sandwiched between the anodic layer and the current collector layer. The current collector layer 24 is desirably a metal foil bonded to the anodic layer. The anode 12 further comprises a lead 26 for electrically connecting the anode to a load. The lead 26 extends beyond the periphery of the anode 12 and is attached to the current collector 24 with an ultrasonic weld.

The anodic layer 20 is desirably a sheet of solid, non-particulate metal that oxidizes under conditions of operation of an electrochemical cell to produce electrical energy. Suitable metals include zinc, aluminum, magnesium, lithium, iron, cadmium, and lead. The solid, non-particulate anodic layer 20 shown in FIG. 3, is an expanded, perforated metal sheet. The expanded, perforated metal sheet is made by passing a non-perforated metal sheet through a pair of rollers having meshing teeth which form a series of slits and corresponding projections in the metal sheet.

The current collector layer 24 extends adjacently and substantially entirely across one side of the anodic layer 20, covers substantially the entire anodic layer, and is pressure bonded to the anodic layer substantially entirely across the one side of the anodic layer. The current collector layer 24 is bonded to the anodic layer 20 with a metal-to-metal bond across the anodic layer so that the current collector layer is in good electrical contact with the anodic layer substantially entirely across the one side of the anodic layer and the electrical contact between the current collector layer and the anodic layer is substantially uniform. Desirably, the current collector layer 24 is bonded to the anodic layer 20 so that the current collector layer is substantially contiguous to the anodic layer substantially entirely across the one side of the anodic layer.

The current collector layer 24 comprises a metal which is capable of conducting electricity produced during discharge of the cell, but not being oxidized during discharge of the cell. Suitable metals for the current collector 24 are non-corrosive metals such as copper, nickel, tin, titanium, or silver. The current collector 24 should be thin and need only be thick enough to carry electric current to and from the anode. The current collector 24 is desirably about 1 mil thick. Thus, the current collector 24 can take the form of a sheet of metal foil sandwiched between the anodic layer 20 and the rigid support 22, as shown in FIG. 3, or can take the form of a layer of metal plated onto either the anodic layer or the rigid support. Suitable methods of plating include electroplating, lamination bonding, sputtering, powder coating or hot stamping a foil. Another suitable method of bonding the current collector 24 is to position a metal foil current collector material in intimate contact with the anodic layer in an electrochemical cell, and then discharging and charging the cell to plate the anodic layer onto the current collector.

Desirably, the current collector 24 is a substantially solid sheet of metal that covers substantially the entire one side of the anodic layer 20 so that there is substantially uniform current density across the anode. For small anodes, holes in the current collector may not be necessary to vent gas produced at the anode, but with larger current collectors, it may be necessary to have at least a sufficient number of pin holes to vent gas through the current collector during discharge of the cell.

The anode lead 26 is made of the same type metal that forms the current collector 24. The lead 26 can be an integral part of the current collector layer 24 or can be a separate lead 18 attached to the current collector. This is particularly advantageous when the current collector layer 24 is a solid, substantially unperforated metal sheet such as metal foil because the lead 26 can be made from foraminous material which is less likely to form a leak path for electrolyte between the lead and the cell case. The lead 26 shown in FIGS. 1 and 2 is made of expanded metal.

Suitable methods for bonding the current collector layer 24 to the anodic layer 20 include pressure bonding which is a method for joining parts together with pressure and with or without heat. No filler metal is employed in pressure bonding. The parts to be joined are first locally heated at the place where the joint is to be formed and are then squeezed together so that they are united with a metal-to-metal bond.

Pressure bonding can be performed by passing two layers of metal through the nip between two rollers or pressing the two layers of metal between a platen and a stationary anvil. Another method of pressure bonding is ultrasonic bonding.

The current collector layer 24 and the anodic layer 20 should be pressure bonded at a temperature and pressure sufficient to create a metal-to-metal bond between the current collector layer and the anodic layer without distorting the current collector layer or the anodic layer. To avoid melting and distortion, the temperature of the heated roller or platen should be less than the melting point of the lowest melting metal of the current collector layer or the anodic layer. For example, a current collector layer comprising a 1 mil thick sheet of silver foil can be pressure bonded to an anodic layer comprising a sheet of expanded, perforated non-particulate metal zinc by pressing the entire current collector layer and anodic layer between a platen having a temperature within the range from about 650° F. (343° C.) to about 750° F. (398° C.) and an anvil at a pressure within the range from about 1,500 to about 5,000 psi. The silver current collector layer is positioned adjacent the heated anvil. This achieves electrical contact between the current collector layer and the anodic layer across substantially the entire one side of the anodic layer. For more efficient manufacturing, the current collector layer and the anodic layer metals are in the form of a clad metal sheet which is made by passing the two layers of metals through the nip between two rollers at elevated temperature and pressure.

The rigid support 22 comprises a material, such as polypropylene, that is not capable of being oxidized during discharge of the cell so that the rigid support maintains support of the current collector during operation of the cell. The purpose of the rigid support 22 is to maintain the current collector layer 24 in a configuration which is substantially the same as the original configuration of the current collector layer during discharging and recharging of the cell. In FIG. 3 the original configuration of the current collector layer 24 is a planar sheet. Thus, the rigid support 22 is a planar sheet and is of sufficient rigidity to maintain the current collector layer 24 in that configuration during operation of the cell. The rigid support 22 extends across substantially the entire current collector layer 24 opposite the anodic layer 20 so that the current collector layer is sandwiched between the anodic layer and the rigid support.

The rigid support 22 shown in FIG. 3 is a substantially solid flat sheet. However, it should be understood that the rigid support 22 should not block the venting of hydrogen gas produced during recharging of electrochemical cells. Desirably, the rigid support 22 forms a flow path for releasing gas produced at the anode. Porous or perforated materials can be used to form a rigid support that allows the release of gas. POREX porous polypropylene available from Porex Technologies, of Fairburn, Georgia is useful to make the rigid support and allows the flow of gas therethrough. The mounting of the rigid support within the cell case 18 is discussed in more detail below, as well as alternative embodiments of the rigid support.

A suitable electrolyte is an aqueous electrolyte including a Group I metal hydroxide such as LiOH, NaOH, KOH, CsOH, or the like.

A suitable air cathode 14 is a porous, sheet-type cathode including an active layer directly adhered to a gas-permeable, liquid-impermeable, wet-proofing layer as disclosed in U.S. Pat. Nos. 3,977,901 and 5,306,579, the disclosures of which are expressly incorporated herein by reference. The active layer of the cathode 14 forms the electrolyte side 30 of the cathode and faces the electrolyte. The active layer includes catalyzed particles of activated carbon and particles of a hydrophobic polymer such as polytetrafluoroethylene. The wet-proofing layer forms the air side 32 of the cathode 14 and includes a mixture of carbon black particles and polytetrafluoroethylene particles. The cathode 14 further includes a metal current collector 34 which has a lead 36 extending therefrom for connection to a positive terminal for the cell 10. Suitable current collectors include fine mesh metal screens and expanded, perforated metal sheets made of non-corrosive metal such as nickel, tin, or titanium.

A suitable cathode can be made in accordance with U.S. Pat. No. 3,977,901 with the following recipe:

| Component | Loading (mg/cm$^2$ of Cathode) |
|---|---|
| ACTIVE LAYER | |
| carbon black (Shawinigan) | 68.5 |
| Teflon T30B | 14.2 |
| Ag | 2.6 |
| NiS | 3.4 |
| Fe WO$_4$ | 3.4 |
| WC/12 wt % Co | 3.4 |
| HYDROPHOBIC LAYER | |
| carbon black | 19.5 |
| Teflon T30B | 3.5 |

The metal-air cell 10 further comprises a system for separating the electrodes of the cell so that the electrodes do not come into direct electrical contact with one another and short-circuit the cell. The separator system also absorbs and wicks electrolyte to keep electrolyte in contact with the electrodes. The separator system includes a first porous web 40 contiguous to the electrolyte side of the anode 12. The first porous web 40 comprises entangled fibers made from a material which is oxidation-resistant under conditions of operation of a metal-air cell and absorbs electrolyte in the cell. The first porous web 40 is desirably made of polymeric fibers or filaments with substantial void space between the fibers or filaments. Suitable polymers for making the first porous web 40 include nylon, polypropylene, and polyvinyl alcohol. The first porous web 40 extends substantially completely across the anodic layer 20 of the anode 12 and is wettable and wicks and distributes the electrolyte across the electrolyte side of the anode. If not naturally wettable with electrolyte, the polymeric fibers or filaments can be surface treated with surfactants or other means to become wettable.

During the first discharge/recharge cycle of a metal-air cell containing the anode 12, the anodic layer 20 is oxidized on discharge to metal oxides or metal ions and on recharge is reformed as a body or cake of particulate metal. The porous web 40 is permeable to the electrolyte and to the ions and compounds of the metal from the anodic layer 20 in the electrolyte of the cell so that during recharging of the cell, the metal can be reformed interstitially through the web into a porous metal structure. The porous web 40 therefore increases the porosity of the anode 12 so that the anode does not become over-densified and passivate, and the interior of the anodic layer 20 is accessible to electrolyte. A suitable material for the first porous web 40 is a nylon fiber web available as Nylon #TR1113G available from Hollingsworth & Vose of East Walpole, Mass. The cell 10 may comprises a second porous web 42 sandwiched between the current collector layer 24 and the rigid support 22 for wicking electrolyte and cooling the anode 12. A suitable material for the second porous web 42 is a web of polyvinyl alcohol and rayon fibers available from the Dexter Corporation of Windsor-Locks, Conn. under the designation 7487.

The separator system of the metal-air cell 10 further comprises separator package 44 disposed between the anode 10 and the cathode 24. The separator package includes first and second polymer separator layers 46 and 48 proximate the anode 12 and first and second porous webs 50 and 52 proximate the cathode 14. The first polymer separator 46 is oxidation-resistant under conditions of operation of the metal-air cell and is permeable to electrolyte, but substantially impermeable to ions and compounds of the metal from the anodic layer 12. Thus, the first separator 46 allows the flow of electrolyte but retains the metallic ions and compounds from the anodic layer 20 at the anode 12 and separate from the other components of the metal-air cell. The first separator 46 extends substantially completely across the entire surface of the first porous web 40 adjacent the anode 12 and also inhibits the growth of metal dendrites on the anode. The second separator 48 is identical to the first separator 46 in structure and function and is positioned contiguously to the first separator. A suitable material for the separators 46 and 48 is 3501 CELGARD wettable microporous polypropylene from Hoechst Celanese Corporation of Charlotte, N. C.

The first and second porous webs 50 and 52 proximate the cathode 14 are porous webs of entangled strands for absorbing electrolyte and wicking the electrolyte across the entire cathode. The porous webs 50 and 52 also space the cathode 14 from the separators 46 and 48 and the anode 12. The first and second porous webs 50 and 52 extend contiguously to one another between the second polymer separator 48 and the air cathode 14. A suitable material for the first and second porous webs 50 and 52 is Nylon #TR1113G available from Hollingsworth & Vose of East Walpole, Mass.

The anode 12, air cathode 14, vents 16, electrolyte, and separator system are all disposed in the cell case 18 comprising a rectangular, box-shaped or prismatic shell 60. The shell 60 comprises a substantially rectangular first member 62 and a substantially rectangular second member 64, both having the shape of a tray. The first member 62 is heat welded to the second member 64 along a single seam 65 to form the prismatic shape. The shell 60 defines a case interior 66 in which the components of the cell 10 are disposed. The anode 12 is disposed proximate the first member 62 and the cathode 14 is disposed proximate the second member 64.

Figure 4:
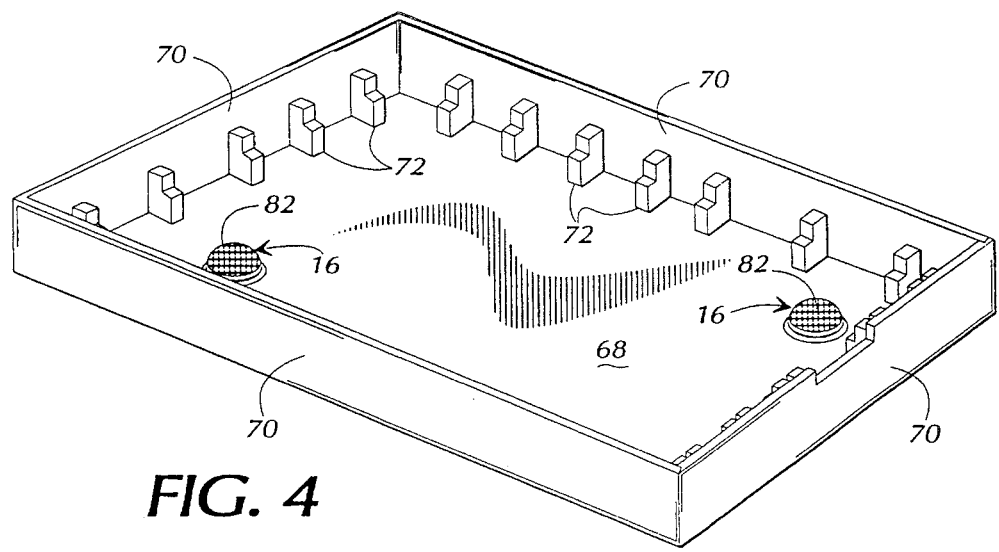
FIG. 4 is a perspective view of the interior of the anode side of the case shell which forms part of the metal-air cell shown in FIG. 1.

The first member 62 of the case shell 60 comprises a planar, rectangular anode panel 68 and four sidewalls 70 extending perpendicularly from the anode panel along the edges of the anode panel. As best shown in FIG. 4, the first member 62 of the case shell 60 further includes a plurality of spacers 72 integral with and extending from the case interior 66 about the periphery of the anode panel 68. The spacers 72 are spaced from one another and space the anode 12 of the cell 10 from the first member 62 as shown in FIG. 3. The rigid support 22 of the anode 12 is mounted on the L-shaped spacers 72 of the first member 62 and is spaced from the anode panel 68 of the first member and the side walls 70 of the first member by the L-shaped spacers.

Figure 5:
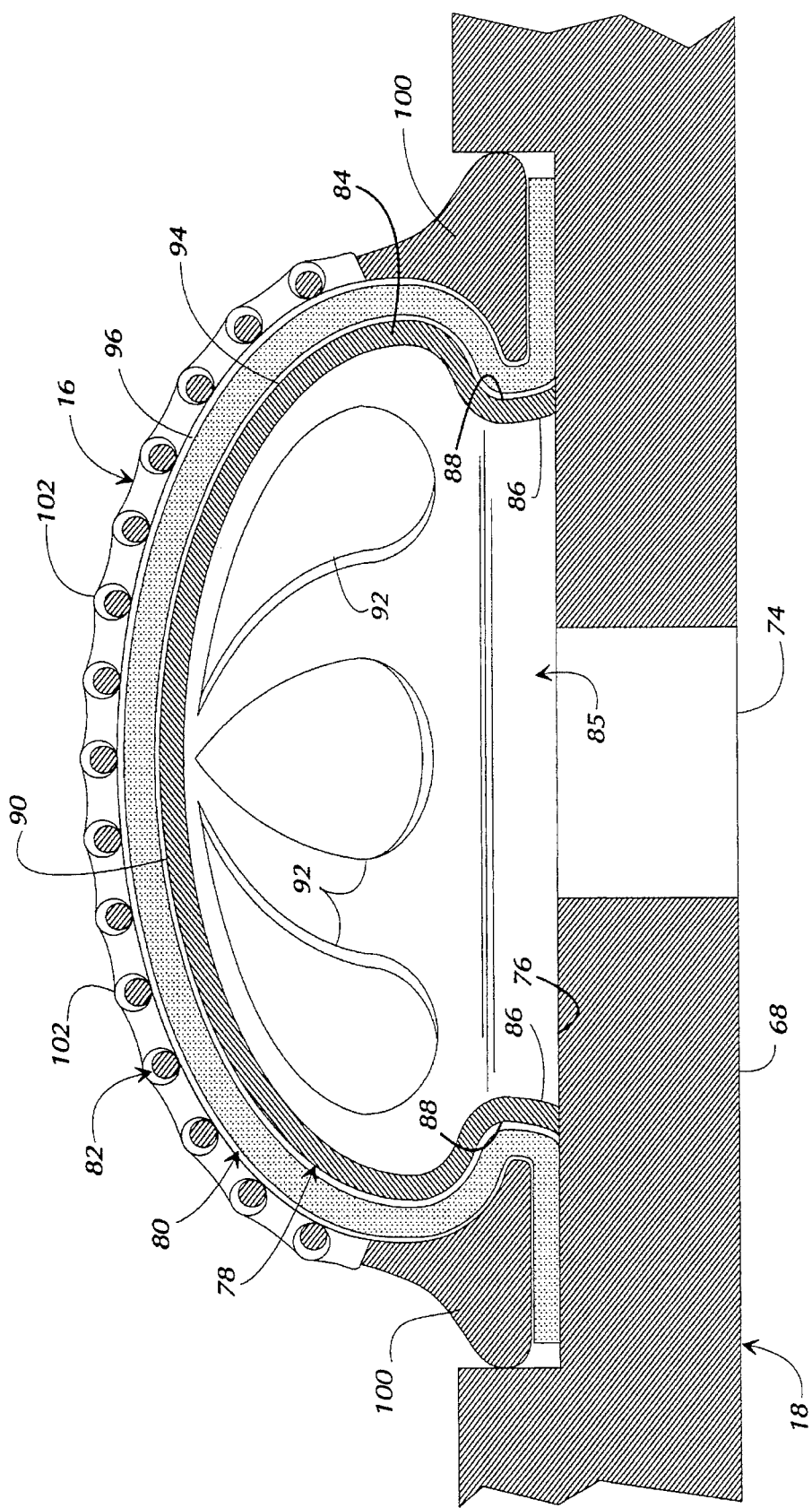
FIG. 5 is a partial, cross-sectional view of a vent which forms part of the metal-air cell shown in FIG. 1.

The anode panel 68 of the first member 62 has a pair of vent openings 74 spaced from one another and positioned near diagonally opposing corners of the case 18. The vent openings 74 receive gas into the case 18 or release gas from the case. Cylindrical recesses 76 in the interior of the anode panel 68 about the vent openings 74 receive the respective vents 16. As shown in FIG. 5, each vent 16 comprises a vent support 78 extending from the anode panel 68, a vent cover membrane 80 covering the vent support, and a catalyst support 82 covering the cover vent membrane.

The vent support 78 comprises a dome 84 extending inwardly from the interior surface of the shell 60 about the vent opening 74. The vent support extends towards the rigid support 22 of the anode 12. The dome 84 of each vent support 78 defines a chamber 85 within the case shell 60 for receiving or discharging gas through the vent openings 74. The dome 84 of the vent support 78 comprises a round base 86 attached to the anode panel 68. The base 86 has a recessed portion 88 encircling the base adjacent the case shell 60. The dome 84 of the vent support 78 further comprises an expanded portion 90 extending from the round base 86 toward the interior 66 of the case 18. The expanded portion 90 of the vent support 78 has a plurality of tear drop-shaped openings 92 for receiving gas into the case 18 or releasing gas from the case through the vent opening 74. The vent support shell is disposed in the case interior 66 so that the vent support has an interior surface 94 facing the case interior.

Desirably, the case shell 60 and the vent support 78 comprise a material, such as polypropylene, that is lightweight and does not corrode when exposed to the electrolyte 18. The vent support can be injection molded and can be heat welded to the anode panel 68 or formed integrally with the first member 62.

The vent cover membrane 80 is a gas-permeable, electrolyte impermeable membrane and extends over the interior surface 94 of the vent support 78 to cover the vent support openings 92 and prevent flow of electrolyte through the vent support openings and the corresponding vent opening 74 in the case shell 60. The vent cover membrane 80 has an interior surface 96 facing the case interior 66. Desirably, the vent cover membrane 80 comprises a microporous polymer membrane such as microporous polyethylene, polypropylene, or polytetrafluoroethylene. A particularly suitable microporous membrane is TEFLON 125-040 microporous membrane available from Fluorglas of Hoosick Falls, N.Y.

The catalyst support 82 is disposed in the case interior 66 adjacent the interior surface 96 of the vent cover membrane 80 and faces the case interior. The catalyst support 82 comprises a foraminous mesh screen 98 encompassed by a ring 100. The screen 98 fits over the vent support 78 and vent cover membrane 80 and the ring 100 is received within the recessed portion 88 of the vent support base 86 to clamp the catalyst support 82 to the vent support and sandwich the vent cover membrane between the catalyst support and the vent support. The catalyst support 82 should clamp the vent cover membrane tightly enough against the anode panel 68 and vent support 78 to prevent leakage of electrolyte around the vent cover membrane. The vent cover membrane can also be welded to the base 86 of the vent support 78 or to the anode panel 68 to prevent leakage of electrolyte around the vent cover membrane.

The mesh screen 98 and the ring 100 of the catalyst support 82 can be made of a material that is inert to the electrolyte and the catalyst 102 on the catalyst support and can withstand the heat generated by the hydrogen/oxygen recombination reaction. The screen 98 and the ring 100 of the catalyst support is desirably made of a metal such as nickel. The ring 100 of the catalyst support 82 should be sized so as to dissipate the heat of the hydrogen/oxygen recombination reaction and not melt the adjacent plastic parts. The catalyst 102 can be any catalyst that is effective to catalyze the recombination of hydrogen and oxygen and is stable in contact with the electrolyte. Suitable catalysts include platinum, palladium, platinized carbon, rhodium, and catalysts typically used in catalytic converters. Generally, noble metals are suitable catalysts.

A rectangular support 104 fits about the interior of the cell case 18. A portion of the anode 12, the first and the second porous webs 40 and 42 proximate the anode, and the separator package 44 extend between the rectangular support 104. A gas-permeable, liquid-impermeable membrane 106 fits tightly between the cell case 18 and the rectangular support 66. The membrane 106 extends across the air side 32 of the cathode 14 and allows passage of air to and from the cathode, but seals electrolyte within the cell case 18. A suitable material for the membrane 68 is CELGARD 2400 microporous polypropylene membrane available from Hoechst Celanese Corporation of Charlotte, N.C.

As best shown in FIG. 1, the second member 64 of the case shell 60 comprises a rectangular, planar cathode panel 108 and four side walls 110 extending perpendicularly from edges of the cathode panel. The cathode panel 108 includes a mask member 112 which extends over and is spaced from the air cathode 14. The mask 112 forms an air plenum over the air cathode 14 and has a plurality of openings 114 substantially evenly distributed across the mask member for allowing air to enter the cathode plenum. The mask member 112 controls the exposure of the air cathode 14 to air. The mask member 112 allows a sufficient amount of air to the cathode 14 for adequate power production from the cell, but limits the exposure of the air cathode to air to minimize exposure of the air cathode to moisture and contaminants to prevent premature failure from flooding, drying out, or contamination. Although not shown in FIG. 1, the cathode plenum formed by the mask member 112 can include a grid structure for maintaining separation between the mask member and the air cathode 14. Alternatively, the cathode plenum can be filled with a porous material, such as non-woven fibrous material. A suitable mask member is disclosed in U.S. Pat. No. 5,328,777 entitled "Cathode Cover For Metal-Air Cell," the disclosure which is expressly incorporated herein by reference in its entirety.

During recharging of the metal-air cell 10, hydrogen gas may be produced at the anode 12, particularly when the cell is overcharged. Hydrogen gas produced at the anode 12 flows from the anode through the gap between the first member 62 of the case shell 60 and the rigid support 22 formed by the L-shaped spacers 72 to the vents 16. Oxygen from air that flows through the vent openings 74 in the case shell 60, into the vent support chambers 85, through the vent support openings 92, and through the gas permeable vent cover membranes 80, recombines with the hydrogen in the case interior 66 at the surface of the catalyst 102 adhered to the catalyst support 98. The recombined hydrogen and oxygen forms water which replenishes the supply of water in the cell 10.

Alternatively to the flat plate rigid support 22 shown in FIG. 3, the rigid support can comprise a rectangular sheet with a plurality of pin holes substantially evenly distributed across the rigid support for releasing gas from the anode, or a rectangular sheet of rigid material having a network of channels running across the side of the rigid support that faces the current collector to provide a flow path for the release of gas from the anode. In addition, the rigid support can comprise a mechanical spring to exert force against the anode 12 and keep the current collector 24 contiguous with the anodic layer 20. For example, the rigid support can comprise a bowed sheet of rigid material that functions as a mechanical spring. When the bowed support is substituted for the flat rigid support 22 shown in FIG. 3, the convex side of the bowed support faces the current collector 24 and the bowed support is compressed so as to be substantially flat as the rigid support 22 is shown in FIG. 3. The rigid support 22 could also include a rectangular rigid plate with a plurality of contoured tabs extending out the plane of the flat sheet of the rigid support from the periphery of the flat sheet. The tabs function as leaf springs when the rigid support is incorporated into a cell.

It should be understood that the foregoing relates to particular embodiments of the present invention, and that numerous changes may be made therein without departing from the spirit and scope of the invention as defined by the following claims.

I claim:

1. A rechargeable electrochemical cell which has two modes of operation, a discharge mode in which electricity is produced and a recharge mode in which electrical energy is stored and hydrogen gas may be produced, the cell comprising:
   a. a case comprising a shell defining a case interior, the shell having a vent opening for receiving gas into the case or releasing gas from the case;
   b. a cathode disposed in the case;
   c. an anode disposed in the case;
   d. a liquid electrolyte disposed in the case and contacting the cathode and the anode; and
   e. a vent disposed in the case interior comprising:
      i. a gas permeable, electrolyte impermeable vent cover membrane having an interior surface facing the case interior and disposed in the case about the vent opening so as to prevent flow of electrolyte through the vent opening;
      ii. a foraminous catalyst support disposed in the case adjacent the interior surface of the vent cover membrane and facing the case interior; and
      iii. an oxygen/hydrogen recombination catalyst supported on the catalyst support for catalyzing the recombination of the hydrogen produced by the cell during the recharge mode with oxygen in the case interior to form water in the case interior.

2. A rechargeable electrochemical cell as in claim 1 wherein the vent defines a chamber within the shell for receiving or discharging air through the vent opening.

3. A rechargeable electrochemical cell as in claim 2 wherein the vent is dome-shaped.

4. A rechargeable electrochemical cell as in claim 1 wherein:
   the vent further comprises a vent support extending inwardly from the shell about the vent opening, having an interior surface facing the case interior, and having an opening for receiving gas into the case or releasing gas from the case through the vent opening; and
   the vent cover membrane extends over the interior surface of the vent support, covers the vent support opening, and is sandwiched between the catalyst support and the vent support.

5. A rechargeable electrochemical cell as in claim 4 wherein the vent support defines a chamber within the shell for receiving or discharging gas through the vent opening.

6. A rechargeable electrochemical cell as in claim 5 wherein the vent support is dome-shaped.

7. A rechargeable electrochemical cell as in claim 6 wherein the vent support has a plurality of openings.

8. A rechargeable electrochemical cell as in claim 4 wherein:
   the vent support has a round base with a recessed portion encircling the base adjacent the shell; and
   the catalyst support comprises a ring and a foraminous screen encompassed by the ring, the screen fitting over the vent support and vent cover membrane and the ring received within the recessed portion of the base to clamp the catalyst support to the vent support and sandwich the vent cover membrane between the catalyst support and the vent support.

9. A rechargeable electrochemical cell as in claim 1 wherein the shell and vent support are plastic.

10. A rechargeable electrochemical cell as in claim 4 wherein the shell and vent support are plastic.

11. A rechargeable electrochemical cell as in claim 1 wherein the vent cover membrane comprises a microporous polymer membrane.

12. A rechargeable electrochemical cell as in claim 4 wherein the vent cover membrane comprises a microporous polymer membrane.

13. A rechargeable electrochemical cell as in claim 1 wherein the catalyst comprises a noble metal.

14. A rechargeable electrochemical cell as in claim 4 wherein the catalyst comprises a noble metal.

15. A rechargeable electrochemical cell as in claim 1 wherein the catalyst is selected from the group consisting of platinum, platinized carbon, and rhodium.

16. A rechargeable electrochemical cell as in claim 4 wherein the catalyst is selected from the group consisting of platinum, platinized carbon, and rhodium.

17. A rechargeable electrochemical cell as in claim 1 wherein the shell has an anode panel proximate the anode and a cathode panel proximate the cathode and the vent extends into the case interior from the anode panel.

18. A rechargeable electrochemical cell as in claim 4 wherein the shell has an anode panel proximate the anode and a cathode panel proximate the cathode and the vent extends into the case interior from the anode panel.

19. A rechargeable electrochemical cell as in claim 1 wherein the shell further comprises a substantially planar anode panel and a substantially planar cathode panel, spaced from and substantially parallel to the anode panel, so that the case is prismatic in shape, and wherein the vent extends into the case interior from the anode panel.

20. A rechargeable electrochemical cell as in claim 4 wherein the shell further comprises a substantially planar anode panel and a substantially planar cathode panel, spaced from and substantially parallel to the anode panel, so that the case is prismatic in shape, and wherein the vent extends into the case interior from the anode panel.

21. A rechargeable metal-air electrochemical cell which has two modes of operation, a discharge mode in which electricity is produced and a recharge mode in which electrical energy is stored and hydrogen gas may be produced, the cell comprising:
 a. a case comprising a shell defining a case interior, the shell having a vent opening for receiving gas into the case or releasing gas from the case;
 b. an air cathode disposed in the case;
 c. an anode disposed in the case;
 d. an aqueous electrolyte disposed in the case and contacting the air cathode and the anode; and
 e. a vent disposed in the case interior comprising:
  i. a gas permeable, electrolyte impermeable vent cover membrane having an interior surface facing the case interior and disposed in the case about the vent opening so as to prevent the flow of electrolyte through the vent opening;
  ii. a foraminous catalyst support disposed in the case adjacent the interior surface of the vent cover membrane, and facing the case interior; and
  iii. an oxygen/hydrogen recombination catalyst supported on the catalyst support for catalyzing the recombination of the hydrogen produced by the cell during the recharge mode with oxygen in the cell interior to form water in the cell interior.

22. A rechargeable metal-air electrochemical cell as in claim 21 wherein the vent defines a chamber within the shell for receiving or discharging air through the vent opening.

23. A rechargeable metal-air electrochemical cell as in claim 22 wherein the vent is dome-shaped.

24. A rechargeable metal-air electrochemical cell as in claim 1 wherein:
 the vent further comprises a vent support extending inwardly from the shell about the vent opening, having an interior surface facing the case interior, and having an opening for receiving gas into the case or releasing gas from the case through the vent opening; and
 the vent cover membrane extends over the interior surface of the vent support, covers the vent support opening, and is sandwiched between the catalyst support and the vent support.

25. A rechargeable metal-air electrochemical cell as in claim 24 wherein the vent support defines a chamber within the shell for receiving or discharging air through the vent opening.

26. A rechargeable metal-air electrochemical cell as in claim 25 wherein the vent support is dome-shaped.

27. A rechargeable metal-air electrochemical cell as in claim 26 wherein the vent support has a plurality of openings.

28. A rechargeable metal-air electrochemical cell as in claim 24 wherein:
 the vent support has a round base with a recessed portion encircling the base adjacent the shell; and
 the catalyst support comprises a ring and a foraminous screen encompassed by the ring, the screen fitting over the vent support and vent cover membrane and the ring received within the recessed portion of the base to clamp the catalyst support to the vent support and sandwich the vent cover membrane between the catalyst support and the vent support.

29. A rechargeable metal-air electrochemical cell as in claim 21 wherein the shell and vent support are plastic.

30. A rechargeable metal-air electrochemical cell as in claim 24 wherein the shell and vent support are plastic.

31. A rechargeable metal-air electrochemical cell as in claim 21 wherein the vent cover membrane comprises microporous polymer membrane.

32. A rechargeable metal-air electrochemical cell as in claim 24 wherein the vent cover membrane comprises microporous polymer membrane.

33. A rechargeable metal-air electrochemical cell as in claim 21 wherein the catalyst comprises a noble metal.

34. A rechargeable metal-air electrochemical cell as in claim 24 wherein the catalyst comprises a noble metal.

35. A rechargeable metal-air electrochemical cell as in claim 21 wherein the catalyst is selected from the group consisting of platinum, platinized carbon, and rhodium.

36. A rechargeable metal-air electrochemical cell as in claim 24 wherein the catalyst is selected from the group consisting of platinum, platinized carbon, and rhodium.

37. A rechargeable metal-air electrochemical cell as in claim 21 wherein the shell has an anode panel proximate the anode and a cathode panel proximate the air cathode and the vent extends into the case interior from the anode panel.

38. A rechargeable metal-air electrochemical cell as in claim 24 wherein the shell has an anode panel proximate the anode and a cathode panel proximate the air cathode and the vent extends into the case interior from the anode panel.

39. A rechargeable metal-air electrochemical cell as in claim 21 wherein the shell further comprises a substantially planar anode panel and a substantially planar cathode panel, spaced from and substantially parallel to the anode panel, so that the case is prismatic in shape, and wherein the vent extends into the case interior from the anode panel.

40. A rechargeable metal-air electrochemical cell as in claim 24 wherein the shell further comprises a substantially planar anode panel and a substantially planar cathode panel, spaced from and substantially parallel to the anode panel, so that the case is prismatic in shape, and wherein the vent extends into the case interior from the anode panel.

41. A case for a rechargeable electrochemical cell which has two modes of operation, a discharge mode in which electricity is produced and a recharge mode in which electrical energy is stored and hydrogen gas may be produced, the case comprising:

a. a shell defining a case interior and having a vent opening for receiving gas into the case or releasing gas from the case; and b. a vent disposed in the case interior and comprising:

i. a gas permeable, electrolyte impermeable vent cover membrane having an interior surface facing the case interior and disposed in the case about the vent opening so as to prevent flow of electrolyte through the vent opening;

ii. a foraminous catalyst support disposed in the case adjacent the interior surface of the vent cover membrane and facing the case interior; and iii. an oxygen/hydrogen recombination catalyst supported on the catalyst support for catalyzing the recombination of the hydrogen produced by the cell during the recharge mode with oxygen in the case interior to form water in the case interior.

42. A case as in claim 41 wherein the vent defines a chamber within the shell for receiving or discharging air through the vent opening.

43. A case as in claim 42 wherein the vent is dome-shaped.

44. A case as in claim 41 wherein:

the vent further comprises a vent support extending inwardly from the shell about the vent opening, having an interior surface facing the case interior, and having an opening for receiving gas into the case or releasing gas from the case through the vent opening; and the vent cover membrane extends over the interior surface of the vent support, covers the vent support opening, and is sandwiched between the catalyst support and the vent support.

45. A case as in claim 44 wherein the vent support defines a chamber within the shell for receiving or discharging gas through the vent opening.

46. A case as in claim 45 wherein the vent support is dome-shaped.

47. A case as in claim 46 wherein the vent support has a plurality of openings.

48. A case as in claim 44 wherein:

the vent support has a round base with a recessed portion encircling the base adjacent the shell; and the catalyst support comprises a ring and a foraminous screen encompassed by the ring, the screen fitting over the vent support and vent cover membrane and the ring received within the recessed portion of the base to clamp the catalyst support to the vent support and sandwich the vent cover membrane between the catalyst support and the vent support.

49. A case as in claim 41 wherein the shell and vent support are plastic.

50. A case as in claim 44 wherein the shell and vent support are plastic.

51. A case as in claim 41 wherein the vent cover membrane comprises a microporous polymer membrane.

52. A case as in claim 44 wherein the vent cover membrane comprises a microporous polymer membrane.

53. A case as in claim 41 wherein the catalyst comprises a noble metal.

54. A case as in claim 44 wherein the catalyst comprises a noble metal.

55. A case as in claim 41 wherein the catalyst is selected from the group consisting of platinum, platinized carbon, and rhodium.

56. A case as in claim 44 wherein the catalyst is selected from the group consisting of platinum, platinized carbon, and rhodium.

57. A case as in claim 41 wherein the shell further comprises a substantially planar anode panel and a substantially planar cathode panel, spaced from and substantially parallel to the anode panel, so that the case is prismatic in shape, and wherein the vent extends into the case interior from the anode panel.

58. A case as in claim 44 wherein the shell further comprises a substantially planar anode panel and a substantially planar cathode panel, spaced from and substantially parallel to the anode panel, so that the case is prismatic in shape, and wherein the vent extends into the case interior from the anode panel.

\* \* \* \* \*